W. V. McCONNELL & C. M. DICKERSON.
Fruit-Picker.
No. 204,748.  Patented June 11, 1878.
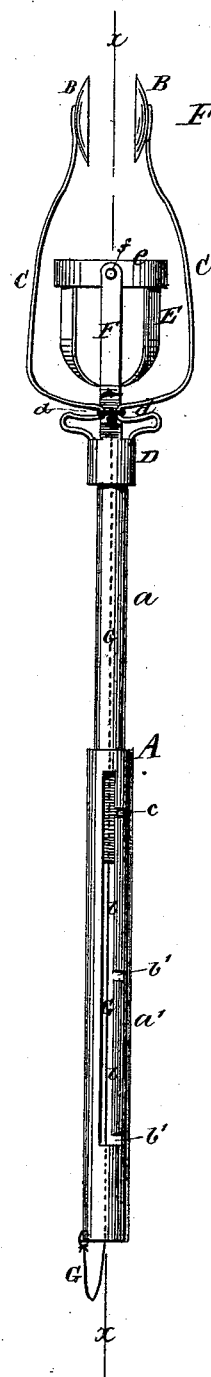
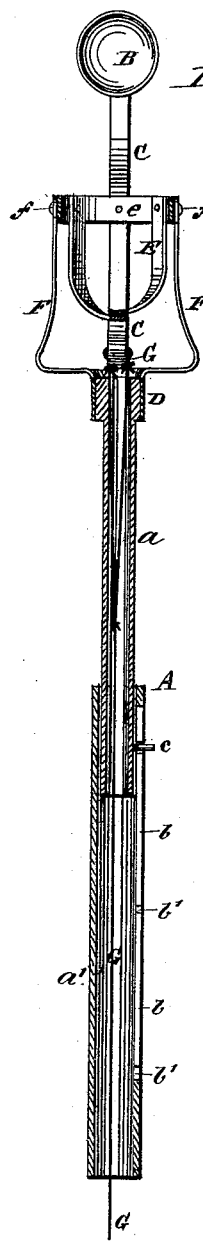
WITNESSES:
Francis McArdle.
C. Sedgwick.
INVENTOR:
W. V. McConnell
C. M. Dickerson
BY Munn & Co
ATTORNEYS.

UNITED STATES PATENT OFFICE.

WILLIAM V. McCONNELL AND CHARLES M. DICKERSON, OF CROCKETT, TEX.

IMPROVEMENT IN FRUIT-PICKERS.

Specification forming part of Letters Patent No. 204,748, dated June 11, 1878; application filed April 11, 1878.

*To all whom it may concern:*

Be it known that we, WILLIAM V. McCONNELL and CHARLES M. DICKERSON, of Crockett, in the county of Houston and State of Texas, have invented a new and Improved Fruit-Picker, of which the following is a specification:

The object of our invention is to furnish a cheap, simple, and convenient device for picking and gathering from trees their fruits growing at various elevations and out of ordinary reach.

Our invention consists in a fruit-picker having cup-shaped self-opening spring-jaws attached to its handle, and operated by a cord to close upon and clamp the fruit; and in the combination, in a fruit-picker, of a hollow extensible adjustable handle and a pair of cup-shaped self-opening spring-jaws, operated to close by a central cord, with each other and with a fruit-receiver suspended (by horizontal pivots) in the axial plane of the handle and jaws, as will be hereinafter described.

In the accompanying drawing, Figure 1 represents a side view of our improved fruit-picker with the handle extended. Fig. 2 is a vertical central section of the same, or taken on the line $x$ $x$ of Fig. 1.

Similar letters of reference indicate corresponding parts.

A is the extensible adjustable handle, made of two parts—viz., an inner hollow rod, $a$, and an outer surrounding sleeve, $a'$, the latter having a longitudinal slot, $b$, in which are side notches $b'$ at intervals. A pin, $c$, fastened to the inner part $a$ through the slot $b$ of the sleeve $a'$, serves to secure the two parts together (when they are adjusted in the desired positions of closed or differently extended) by being lodged into one or other of the notches $b'$ by a slight turn of the sleeve $a'$ upon the rod $a$, when the said pin is brought in position directly opposite the said notch.

B B are two cups or concave plates, fixed with the concave sides opposite to each other and to the central line $x$ $x$ by being secured to the upper ends of two oppositely-placed spring-bars, $c$, whose lower ends are fixed on or attached to the ferrule D on the upper end of the rod $a$.

The springs C, diverging from the ferrule D, are bent toward each other at a little distance above the same, to form on each of them a loop, $d$, for facilitating the attachment of a chain or cord to connect them together, and to a cord, G, arranged inside the hollow handle A, and long enough to reach down below the same, even when fully extended.

The springs C are so arranged that when in their normal position the cups B will be at a sufficient distance apart to admit between them the largest fruit intended to be picked from the tree, which latter operation is done by pulling the cord G to clamp the fruit between the cups B, and, by a simultaneous downward pull of the handle A, detach the fruit from the tree.

By releasing the rope G from the strain of the pull, the cups or jaws B and their springs C resume their normal position, and the fruit, released from the jaws B, drops into the receptacle E.

To prevent the fruit from falling out of the receptacle E in inclining the picker, the said receptacle is provided with an upper rigid ring or rim, $e$, having opposite horizontal pins $f$, by which it is pivoted in the upper ends of a pair of uprights, F, secured with their lower ends to the upper end of the rod $a$ of the handle A.

By this construction the receptacle E may be suspended perpendicularly as impelled by its weight, while allowing of any inclination of the picker in a plane at right angles to the pivotal line $f f$.

If desired, the same effect may be produced, with regard to an inclination in a plane at any other angle to the pivotal line, by pivoting the receptacle E to the uprights F by means of a complete gimbal.

Having thus described our invention, we claim as new and desire to secure by Letters Patent—

1. A fruit-picker having cup-shaped self-opening spring-jaws B C attached to its handle A, and operated by a cord, G, to close upon and clamp the fruit, substantially as specified.

2. The combination, in a fruit-picker, of the hollow extensible adjustable handle A and the pair of cup-shaped self-opening spring-jaws B C, operated to close by the central cord G, with each other and with the fruit-receiver E, suspended (by horizontal pivots $f$) in the axial plane of the handle A and jaws B, substantially as and for the purpose set forth.

WILLIAM V. McCONNELL.
CHARLES M. DICKERSON.

Witnesses:
J. H. WALL,
HERBERT WAGNER.